Patented Sept. 9, 1924.

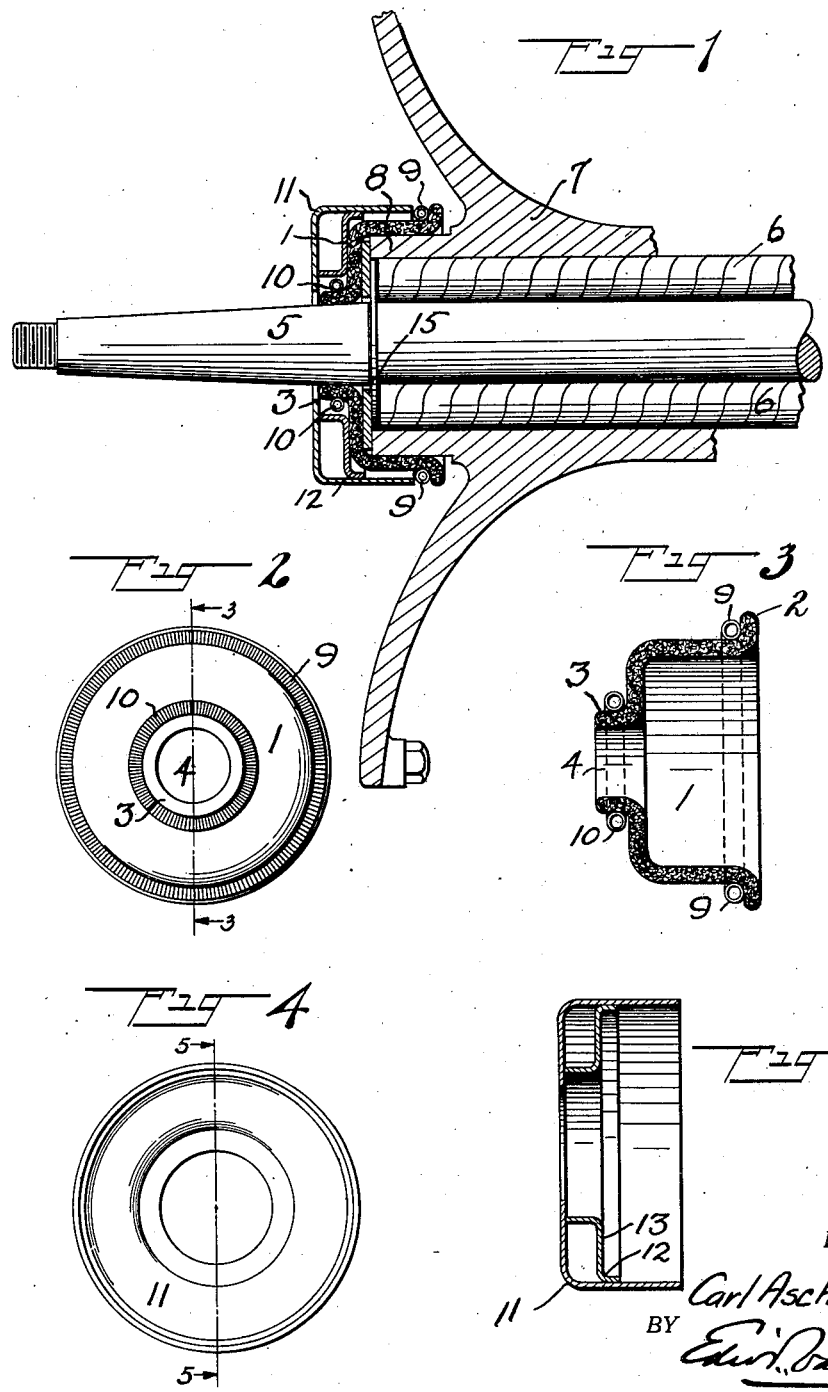

1,507,567

UNITED STATES PATENT OFFICE.

CARL ASCHENBACH, OF NORTH PLAINFIELD, NEW JERSEY.

GREASE RETAINER FOR AXLE HOUSINGS.

Application filed March 15, 1923. Serial No. 625,332.

*To all whom it may concern:*

Be it known that I, CARL ASCHENBACH, a citizen of the United States of America, residing in North Plainfield, Somerset County, State of New Jersey, have invented certain new and useful Improvements in Grease Retainers for Axle Housings, of which the following is a specification.

The invention relates to grease or oil retainers and more particularly to that type used in a rear axle housing of an automobile and has for its object to provide a simple and cheap retainer, easily installed that will retain the oil in the differential housing when applied as a packing outside the roller bearings.

In retainers commonly employed the packing is inserted inside the roller bearing and thereby causes the bearing to run dry for lack of oil and this type of retainer requires more labor for installing with special tools and consequently is more costly. With my device all that is necessary is the removal of the wheel, slip pliable washer home over the axle spindle, put on the cap and return the wheel.

The foregoing and other features of my invention will now be described in connection with the accompanying drawings forming part of this specification in which I have represented my grease retainer in its preferred form, after which I shall point out more particularly in the claims those features which I believe to be new and of my own invention.

In the drawings:—

Figure 1 is a section of a typical rear axle housing of an automobile showing the roller bearing, the axle spindle and my grease retainer in position.

Figure 2 is an end view of my grease retainer with the cap removed showing the compressible spring members in their relative position.

Figure 3 is a section along the lines 3—3 Figure 2.

Figure 4 is a detail of the cap which I employ.

Figure 5 is a section along the lines 5—5, Figure 4 showing the inner annular ring provided to press the pliable retainer into position and to give free play to the contractile spring.

In the carrying out of my invention I provide a pliable cup washer 1 provided with a flaring angular flange 2 at its periphery and a reduced portion 3 in the form of an angular flange.

It will be observed from the drawing, Figure 3, that the cross-section of the cup washer 1 is approximately ninety degrees and both the angular flanges have a similar cross-section.

The flange 3 is provided with a central opening 4 adapted for passing over an axle spindle 5. The axle spindle is illustrated as a tapered type and is common to automobiles. The axle runs in roller bearing 6 mounted in housing 7 provided with a shoulder 8 over which the flaring angular flange 2 of the pliable cup washer 1 snugly fits. This fit is kept tight by the springs 9. A similar coiled spring 10 contracts the central opening 4 providing close intimate contact between the pliable cup washer 1 and the axle spindle. The angular flanges 2 and 3 are formed by turning outwardly the outer and inner periphery of the cup washer and provide seats for the contractile members 9 and 10 respectively.

It will be readily understood that other means for contracting the angular flanges 2 and 3 may be employed and when the pliable washer is made of rubber these springs may be omitted as the contractile means is the property of the article itself. In all probability leather will be the best material.

In order to hold the cup washer in place up against the end of the axle housing I provide a cup 11 on the inside of which I provide an annular ring 12 which is formed to present a surface 13 to press the pliable cup washer in place at the same time not to interfere with the action of the spring 10.

The annular ring 12 may be made simply as a ring with the cap fitting tight against the cup washer, the important function being to press the cup washer up against the end of the roller bearing and to hold it there in position without interfering with the spring action. On the inside of the pliable cup washer 1 I provide a washer 15 to prevent the bearing from rubbing against the pliable washer.

I wish it distinctly understood that my grease retainer herein described and illustrated is in the form in which I desire to construct it and that changes or variations may be made as may be convenient or desirable without departing from the salient features of my invention and I therefore intend the following claims to cover such modifications as naturally fall within the lines of invention.

I claim:—

1. A device of the class described comprising a pliable cup washer having its periphery in the shape of a flaring annular flange adapted for passing over an axle housing and provided with a reduced portion in the shape of an angular flange having a central opening for passing over an axle spindle, contractile means for both the large and small flanges.

2. A device of the class described, comprising a pliable cup washer of substantially rectangular cross-section provided with angular flanges at its inner and outer perimeters, both of said flanges extending at substantially ninety degrees to that portion of the body on which they are formed.

3. A device of the class described in combination, a pliable cup washer having its periphery in the shape of an annular flange adapted for passing over an axle housing and provided with a reduced portion in the shape of an annular flange having a central opening for passing over an axle spindle, contractile means for both the large and small annular flanges, a washer adapted to fit inside the cup washer, a cap provided with means to press against the cup washer at the same time permit free movement of the contractile members.

4. The device of claim 3 the cap covering the entire pliable washer and holding it to the axle housing.

In testimony whereof I affix my signature in the presence of two witnesses.

CARL ASCHENBACH.

Witnesses:
LAURA LE ROY,
EDWD. VAN WINKLE.